United States Patent [19]

Kato et al.

[11] Patent Number: 4,634,954
[45] Date of Patent: Jan. 6, 1987

[54] VOLTAGE REGULATOR FOR ALTERNATING CURRENT GENERATOR

[75] Inventors: Hidetoshi Kato, Suzuka; Nobuo Mayumi; Shin Kusase, both of Oubu; Hajime Matsuhashi, Kariya, all of Japan

[73] Assignee: Nippondenso Co., Ltd., Kariya, Japan

[21] Appl. No.: 635,181

[22] Filed: Jul. 27, 1984

[30] Foreign Application Priority Data

Sep. 22, 1983 [JP] Japan .................................. 58-175779

[51] Int. Cl.⁴ .............................................. H02J 7/14
[52] U.S. Cl. ........................................ 322/28; 320/64; 322/29; 322/73
[58] Field of Search ..................... 322/28, 29, 32, 35, 322/60, 73, 99; 320/61, 64, 68

[56] References Cited

U.S. PATENT DOCUMENTS

| | | | |
|---|---|---|---|
| 3,858,108 | 12/1974 | Bray | 322/73 X |
| 3,984,755 | 10/1976 | Lehnhoff et al. | 322/73 X |
| 4,128,799 | 12/1978 | Morishima | 322/28 |
| 4,368,417 | 1/1983 | Matsuyama | 320/64 X |

Primary Examiner—R. J. Hickey
Attorney, Agent, or Firm—Cushman, Darby & Cushman

[57] ABSTRACT

A voltage regulating system for an automotive vehicle having a switching transistor connected to a field winding of an alternating current generator and a regulator for comparing a battery voltage with a reference value and for driving the transistor into a conductive state when the battery voltage is lower than the reference value. A current limiting circuit is provided for limiting the field current when the switching transistor is going to be driven into the conductive state over a predetermined interval, so that a maximum charging current can be obtained and an unfavorable heating of the switching transistor can be avoided.

8 Claims, 11 Drawing Figures

VOLTAGE REGULATOR FOR ALTERNATING CURRENT GENERATOR

BACKGROUND OF THE INVENTION

1. Field of Invention

The present invention relates to a voltage regulator for an alternating current generator, and more particularly to a control apparatus for controlling a generating voltage of a generator for an automotive vehicle and for charging a battery mounted on the vehicle.

2. Brief Description of Prior Art

In a conventional voltage regulator of this kind, a generating voltage of an alternating current generator is maintained at a constant value by controlling a field current for the generator irrespective of a rotational speed of the generator and an increase or decrease of electrical loads.

When a large electrical load, such as head lamps of an automotive vehicle or the like, is used in a range of a low speed running operation of the generator, a field current for a field winding is rapidly increased by the voltage regulator until the generating voltage reaches a predetermined value. And unless the generating voltage reaches this value, the field current is increased to its maximum value. In a generally-known alternating current generator, in particular, in a generator wherein a field current is branched off from a battery charging line and supplied to the field winding, an effective battery charging current is rather decreased even if the field current is further increased after the field current exceeds a predetermined value, since the effective charging current is obtained by subtracting the field current from a generated current at the generator.

According to the observations of the present inventors, it was found out that a maximum field current by which a maximum effective charging current is obtained depends on a rotational speed of the generator and is increased in response to the increase of the rotational speed of the generator. This will be further discussed in the following description.

According to the above observations, it is useless to increase the field current above a predetermined value, since to do so may cause a problem in that a power transistor of the voltage regulator for controlling a supply of the field current may be unnecessarily heated.

SUMMARY OF INVENTION

It is therefore an object of the present invention to provide a voltage regulator of an alternating current generator for an automotive vehicle, according to which a field current is maintained at not more than a predetermined maximum value which varies in dependence on a rotational speed of the generator and at which a maximum effective battery charging current can be obtained.

DETAILED DESCRIPTION OF PREFERRED EMBODIMENTS

Figure 1:
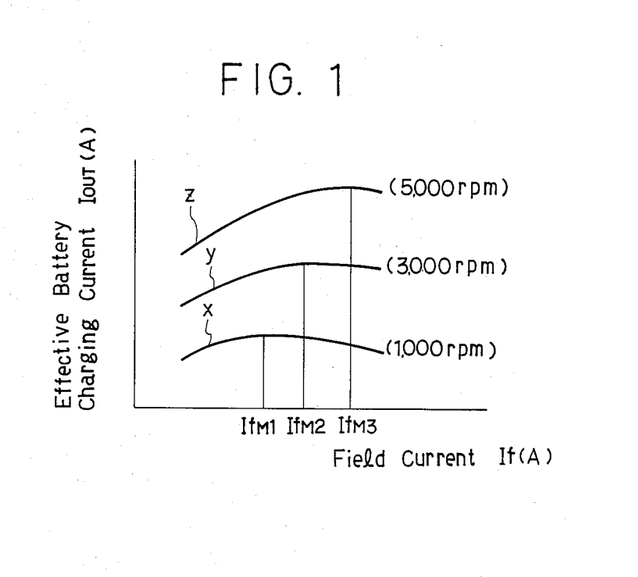
FIG. 1 is a graph showing a relationship between an effective battery charging current and a field current.

The present invention will now be explained with reference to the embodiments shown in the attached drawings. FIG. 1 shows a relationship between an effective battery charging current and a field current, wherein X, Y and Z designate characteristic curves obtained when an alternating current generator is operated at 1,000 rpm, 3,000 rpm and 5,000 rpm, respectively. It can be seen in FIG. 1 that the effective battery charging current is increased at first in response to the increase of the field current while it will be decreased when the field current exceeds a predetermined value, for example the field current $I_{fM1}$ with respect to the curve X. This predetermined value is hereinafter referred to as an appropriate maximum field current. As can be seen in FIG. 1, the appropriate maximum field current at which a maximum effective battery charging current is obtained is in dependence on the rotational speed of the generator (or an engine) and becomes a higher value as the rotational speed is increased.

Figure 2:
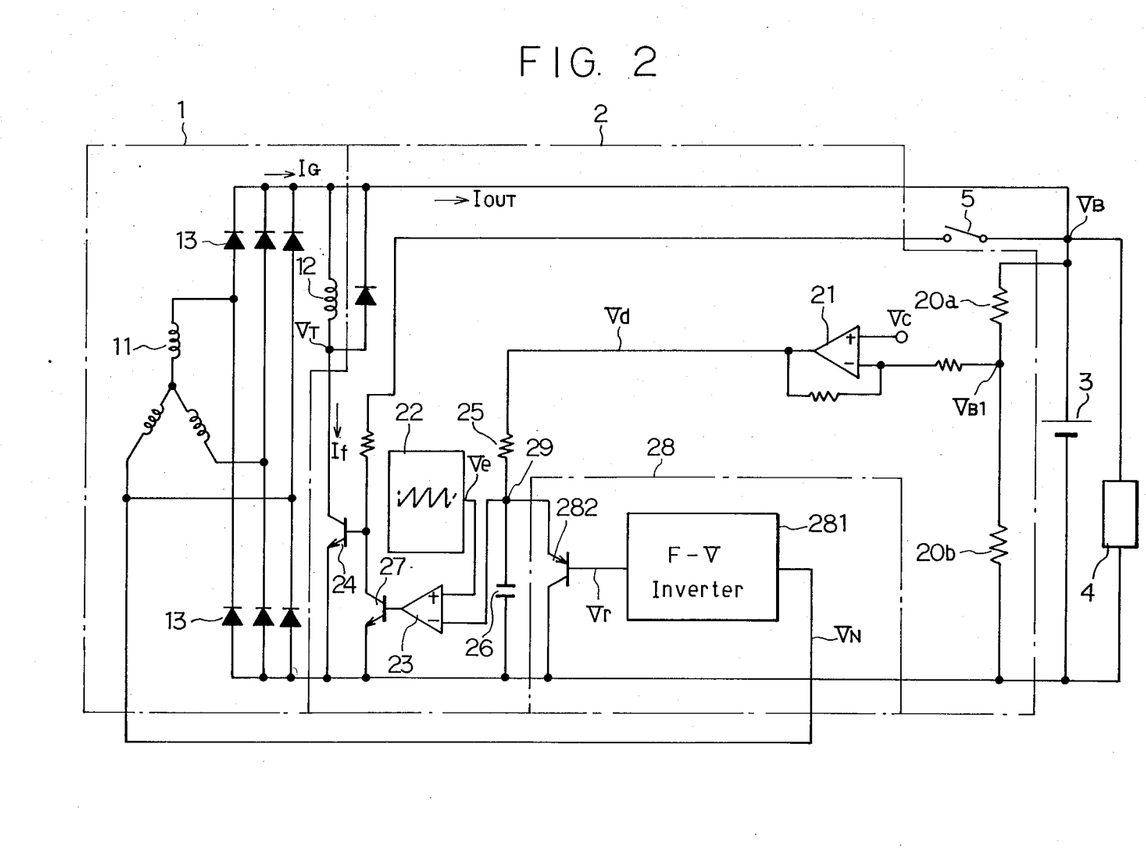
FIG. 2 is an electric wiring diagram of a voltage regulator according to a first embodiment of the present invention.

The first embodiment of the present invention is shown in FIG. 2, wherein numeral 1 designates an alternating current generator having star-connected armature windings 11, a field winding 12 and full-wave rectifying diodes 13. The generator is mounted on an automotive vehicle (not shown) and driven thereby.

Numeral 2 designates a voltage regulator, usually attached to or mounted within a housing of the generator, numeral 3 designates a battery, numeral 4 is an electrical load such as head lamps and so on, and numeral 5 is an ignition key switch.

The voltage regulator 2 includes an operational amplifier 21 for comparing a reference voltage $V_C$ and a battery feed-back voltage $V_{B1}$ divided by resistors 20a and 20b, and for producing a voltage signal Vd reflecting the comparison (difference) between $V_C$ and $V_{B1}$. Numeral 22 designates a generating circuit for generating a saw-tooth wave signal Ve, which is supplied to a non-inverting input terminal of a comparator 23. The voltage signal Vd from the operational amplifier 21 is supplied to an inverting input terminal of the comparator 23 through a delay circuit having a resistor 25 and a capacitor 26, so that the voltage signal Vd is compared with the saw-tooth wave signal Ve. An output signal from the comparator 23 is supplied to a base of a transistor 27, a collector of which is connected to a base of a power (switching) transistor 24, so that when the input voltage Ve at the non-inverting input terminal of the comparator 23 from the saw-tooth wave generator 22 is higher than the input voltage Vd at the inverting input terminal, the transistor 27 is made conductive and the power transistor 24 is thereby turned off to cut the field current $I_f$ flowing through the field winding 12.

Numeral 28 designates a current limiting circuit including a frequency-voltage (F/V) invertor 281 and a PNP transistor 282. The F-V invertor 281 is connected to one of the armature windings 11 to receive a frequency signal $V_N$ representing a rotational speed of the generator 1. The F-V invertor 281 produces a voltage signal Vr in accordance with the received frequency signal.

The voltage signal Vr is supplied to a base of the transistor 282, and an emitter of which is connected to a juncture 29 between the resistor 25 and the capacitor 26, so that when the voltage Vd at this juncture 29 becomes higher than the voltage Vr at the base of the transistor 282, the transistor 282 becomes conductive so as to decrease the voltage at the juncture 29. As above, the voltage at the juncture 29 is prevented from becoming higher than the voltage at the base of the transistor 282, namely the voltage at the juncture 29 is kept substantially equal to or lower than the voltage at the base of the transistor 282.

In FIG. 2, $I_G$, $I_f$ and Iout designate a generated current at the generator 1, a field current branched off from the generated current $I_G$ and flowing through the field winding 12, and an effective battery charging current, respectively.

Now the operation of the above described embodiment will be explained with reference to FIGS. 3 and 4.

Figure 3:
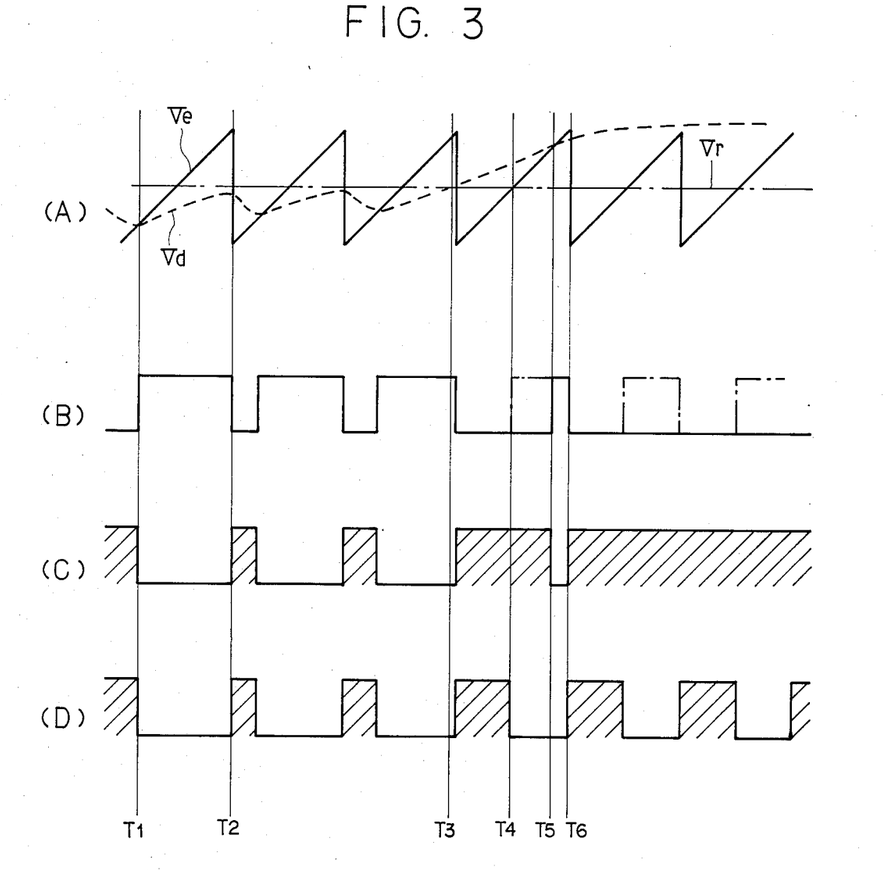
FIG. 3 is a waveform diagram showing voltages at different points in the above embodiment, for explaining an operation of the first embodiment.

In FIG. 3, a dotted line in (A) designates the output voltage Vd from the operational amplifier 21, while a rectangular wave indicated by a solid line in (B) shows a collector voltage of the transistor 24. Hatched areas in (C) and (D) of FIG. 3 show periods during which field current is flowing through the field winding 12. When the saw-tooth wave voltage Ve becomes higher than the output voltage Vd at a time T1, the comparator 23 produces a high level signal to make the transistor 27 conductive, to thereby turn off the power transistor 24. Then the field current is cut off and the battery voltage as well as the generated current at the generator is accordingly decreased, with the result that the output voltage Vd of the operational amplifier 21 is gradually increasing. At a time T2, the saw-tooth wave voltage Ve becomes lower than the output voltage Vd, to make the transistor 27 non-conductive and finally to turn on the power transistor 24. As above, the transistor 24 is repeatedly turned on and off and its duty ratio depends on the comparison between the saw-tooth wave voltage Ve and the output voltage Vd from the operational amplifier 21, that is, the duty ratio of ON-OFF operation of the power transistor depends on the battery voltage, and the duty ratio of the ON time becomes naturally larger as the battery voltage becomes lower, whereby the battery voltage is controlled at a desired value.

Now assuming that the generator 1 is operated at a speed of 1,000 rpm, and the F-V invertor 281 is producing an output of Vr as indicated by a one-dot-chain line in (A) of FIG. 3. Then at a time T3, the output voltage Vd of the operational amplifier 21 is going to be higher than the output voltage Vr of the F-V invertor 281. Under this condition, a voltage at the juncture 29 is limited to the output voltage Vr from the current limiting circuit 28 and accordingly the transistors 27 and 24 are turned on and off each time when the saw-tooth wave voltage Ve traverses the output voltage Vr as indicated by the hatched areas in (D) of FIG. 3.

In a case where the current limiting circuit 28 is not provided, the transistors 27 and 24 are turned on and off in accordance with the comparison between the output voltage Vd and the saw-tooth wave voltage Ve, and thereby the field current may flow as indicated by hatched areas in (C) of FIG. 3. As seen from (C) of FIG. 3, the field current continues to flow through the field winding after a time T6, resulting in that the field current in this case exceeds the appropriate maximum field current $I_{fM1}$ and the effective battery charging current may be decreased. On the other hand, according to the present invention, namely due to the provision of the current limiting circuit 28, the maximum duty ratio of the power transistor 24 is determined by the output voltage Vr from the current limiting circuit 28, as shown by the hatched areas in (D) of FIG. 3, with the result that the mean field current corresponds to the appropriate maximum field current $I_{fM1}$ so that the maximum effective charging current can be obtained.

Figure 4:
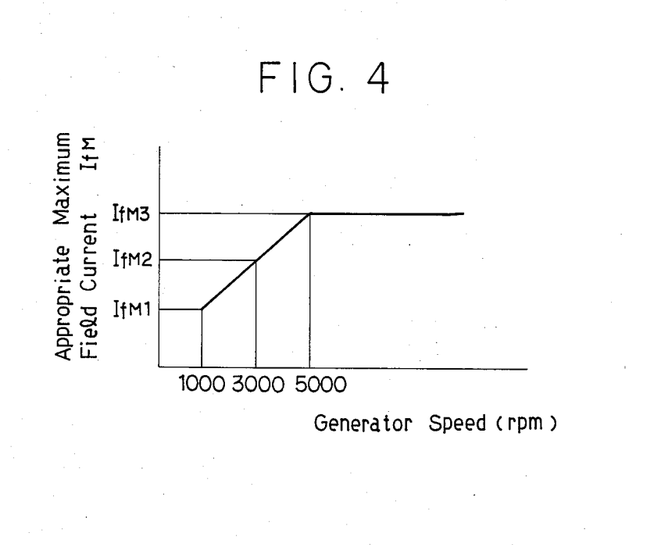
FIG. 4 is a graph showing a relationship between a maximum field current at which a maximum effective battery charging current is obtained and a rotational speed of the generator.
Figure 5:
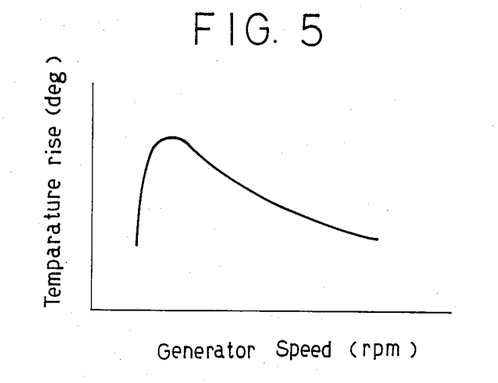
FIG. 5 is a graph showing a relationship between a temperature increase of the voltage regulator and the rotational speed of the generator.

As understood from the above disclosure, the field current of the present invention is prevented from being made higher than the appropriate maximum field current for the respective rotational speed of the generator (See FIG. 4). As a result useless field current may not flow through the field current therefore unfavorable heating of the switching transistor of the voltage regulator does not occur. This is particularly preferable when the generator is running at a relatively low speed, since the temperature rise of the switching transistor or the voltage regulator is remarkable at low speed as shown in FIG. 5.

Figure 6:
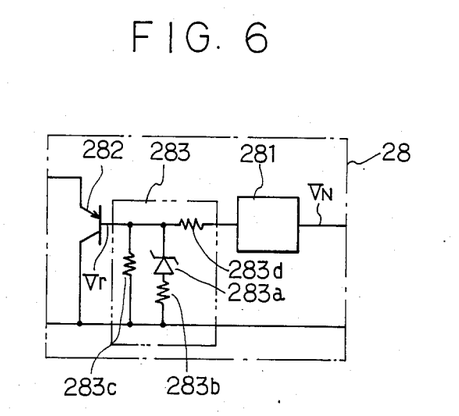
FIG. 6 is an electric wiring diagram showing a principal portion of a modified embodiment of the present invention.

FIG. 6 shows a modification of the current limiting circuit 28, wherein a variable gain circuit 283 is provided between the transistor 282 and the F/V inverter 281. The variable gain circuit 283 comprises a zener diode 283a and resistors 283b to 283d, so that when the output voltage from the F/V inverter 281 exceeds a breakdown voltage of the zener diode 283a, the varying ratio of the output voltage Vr is changed.

The second embodiment will be explained with reference to FIGS. 7 and 8, wherein the same reference numeral designates the same or similar elements to that of the first embodiment.

Figure 7:
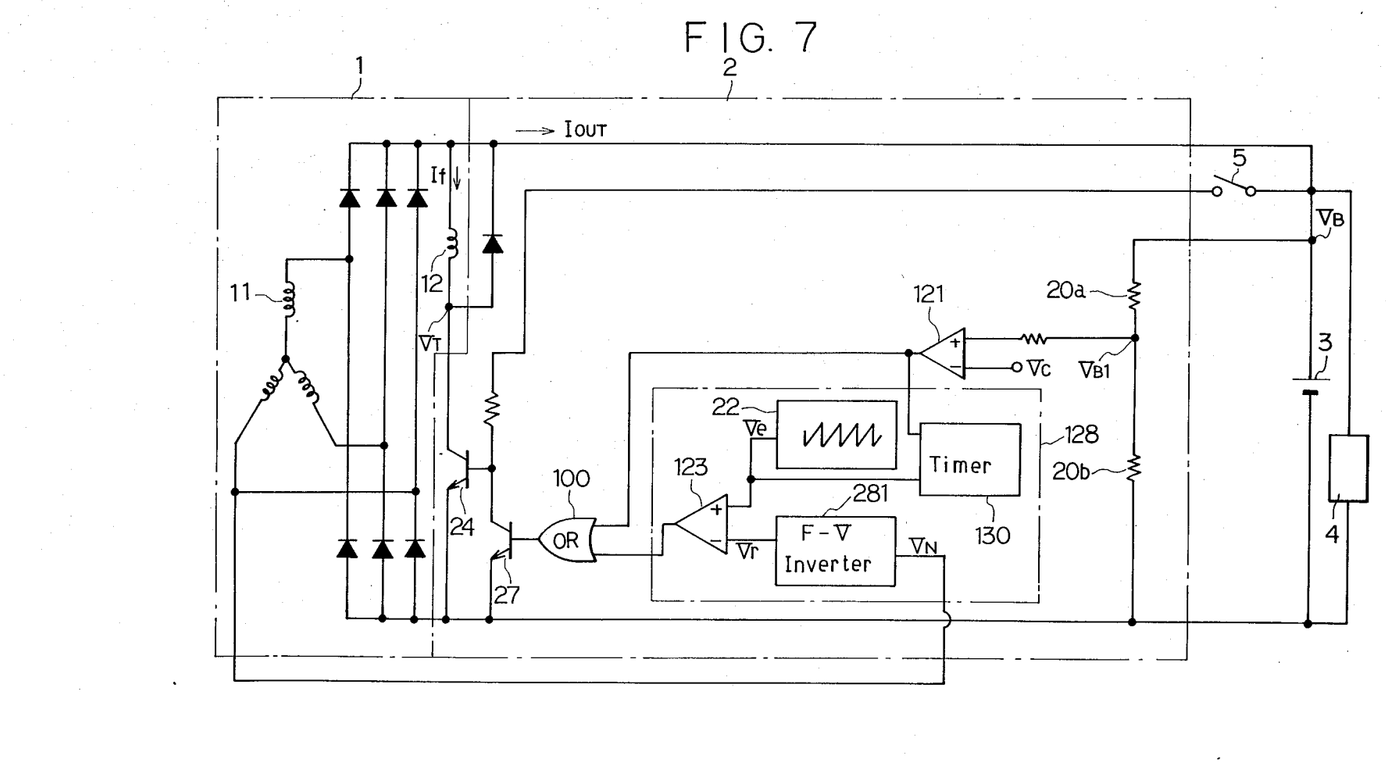
FIG. 7 is an electric wiring diagram of a voltage regulator according to a second embodiment of the present invention.

In FIG. 7, numeral 121 designates a comparator for comparing the battery feed-back voltage $V_{B1}$ with the reference voltage $V_C$ and for producing a high level or a low level signal in accordance with the comparison therebetween. The output of the comparator 121 is supplied to one input terminal of an OR gate 100, the other input terminal of which is connected to a current limiting circuit 128. The circuit 128 comprises a timer circuit 130, a saw-tooth wave voltage generating circuit 22, an F-V inverter 281 and a comparator 123 to which both output voltages Ve and Vr from the circuit 22 and the inverter 281 are supplied, so that a high-level signal is supplied to the OR gate when the voltage Ve is higher than the voltage Vr. The output terminal of the OR gate 100 is connected to the base of the transistor 27.

The timer circuit 130 receives the output signal from the comparator 121 and passes the saw-tooth wave voltage Ve to the comparator 123 only when the low-level signal from the comparator 121 remains over a predetermined time interval. More specifically, so long as the high-level and low-level signals are alternately supplied to the timer circuit 130 within the above predetermined intervals, the output voltage Ve of the circuit 22 may not be supplied to the comparator 123, so that it produces the low-level signal.

Figure 8:
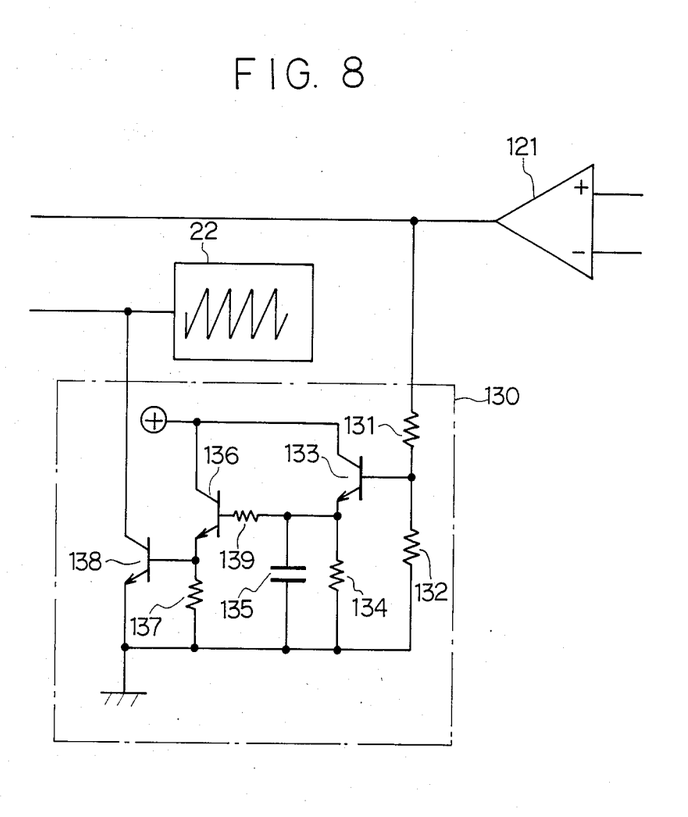
FIG. 8 is an electric wiring diagram showing one example of a timer circuit in FIG. 7.

One example of the timer circuit 130 is shown in FIG. 8, wherein a transistor 133 is connected at its base to the comparator 121 and is turned on and off in response to the high- and low-level signals therefrom. An emitter of the transistor 133 is connected to a parallel circuit of a resistor 134 and a capacitor 135, so that a voltage across the capacitor 135 is kept at more than a preset value so long as the transistor is periodically turned on within the above-mentioned predetermined intervals. A base-emitter path of a transistor 136 is connected across the capacitor 135 so that it is kept in a conductive state so long as the voltage across the capacitor 135 is larger than the preset value. The emitter of the transistor 136 is connected to a base of a transistor 138, a collector of which is connected to an output terminal of the saw-tooth wave voltage circuit 22, so that when the transistor 138 is in a conductive state the saw-tooth wave voltage Ve is not supplied to the OR gate 100. When the low-level signal is produced from the comparator 121 for more than the predetermined internal, the charge on the capacitor 135 is discharged through the resistor 134, with the result that the transistors 136 and 137 are made into the non-conductive state, and then the voltage Ve is going to be supplied to the OR gate 100. In FIG. 8, numerals 131, 132, 137 and 139 designate resistors.

An operation of the second embodiment will be explained with reference to FIG. 9.

Figure 9:
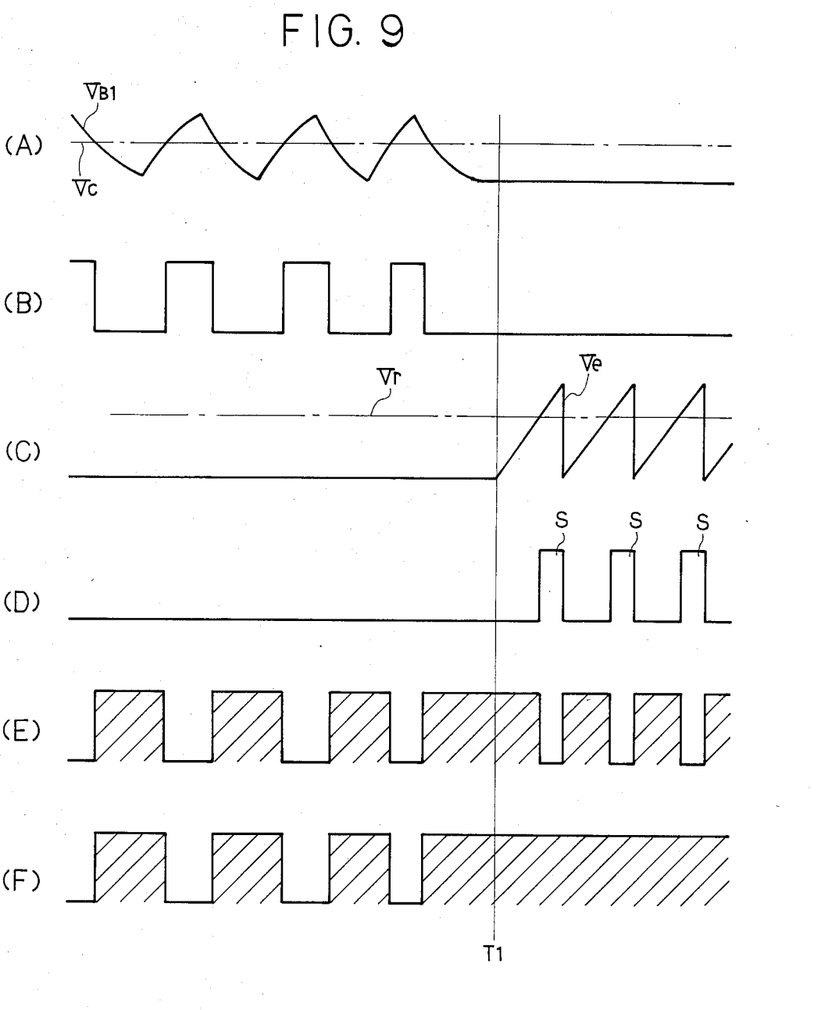
FIG. 9 is a waveform diagram showing voltages at different points in the above second embodiment for explaining an operation thereof.

The battery voltage $V_{B1}$ changes as indicated by a solid line in (A) of FIG. 9 and thereby the comparator 121 produces a high- and low-level signal as shown in (B). Since the comparator 121 produces high- and low-level signals periodically until a time T1 (See (C) of FIG. 9), the saw-tooth voltage Ve is not supplied to the comparator 123 and its output remains at a low-level as shown in (D) of FIG. 9, so that the field current flows through the field winding in accordance with the output signal from the comparator 121 as indicated by hatched areas in (E) of FIG. 9. At the time T1, the output voltage Ve begins to be supplied to the comparator 123, and its high level signals S shown in (D) are supplied to the OR gate 100, so as to intermittently cut off the field current, whereby the mean field current is maintained at the appropriate maximum field current ($I_{FM}$). When the current limiting circuit 128 is not provided, the field current is kept to flow through the field winding as shown by hatched areas in (F) of FIG. 9, causing an unfavorable decrease of the effective charging current and an unnecessary heating of the power transistor 24 and/or the regulator itself.

Figure 10:
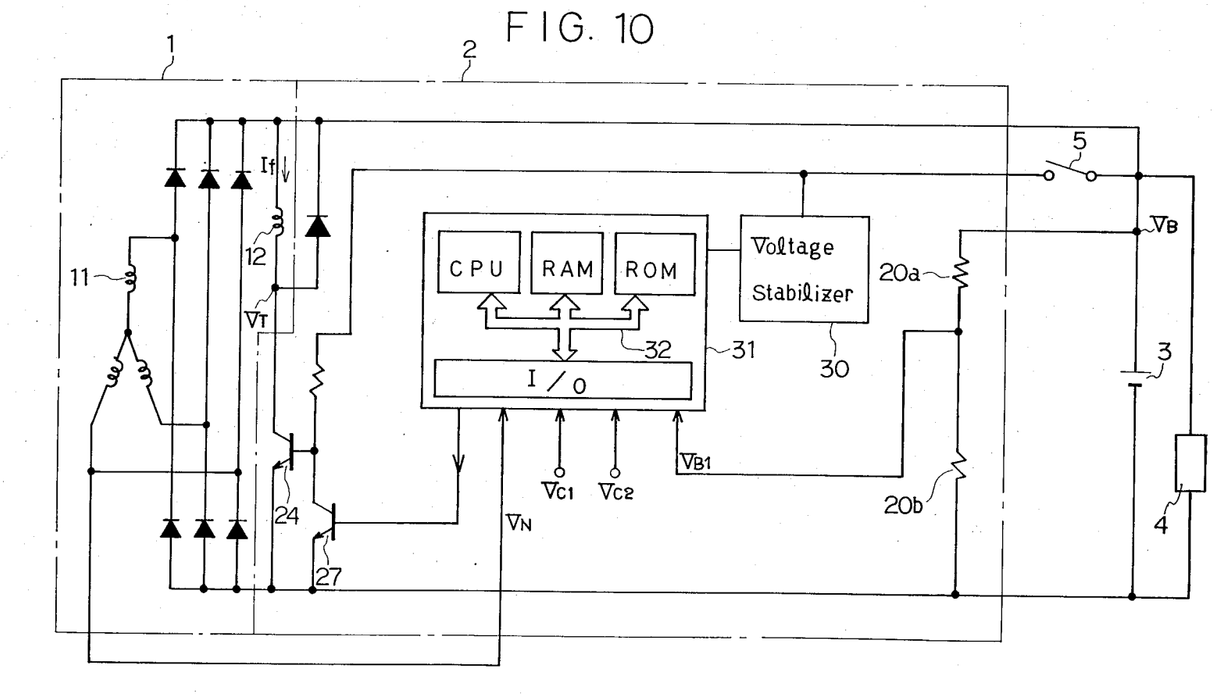
FIG. 10 is an electric wiring diagram of a voltage regulator having a microcomputer according to a third embodiment of the present invention.
Figure 11:
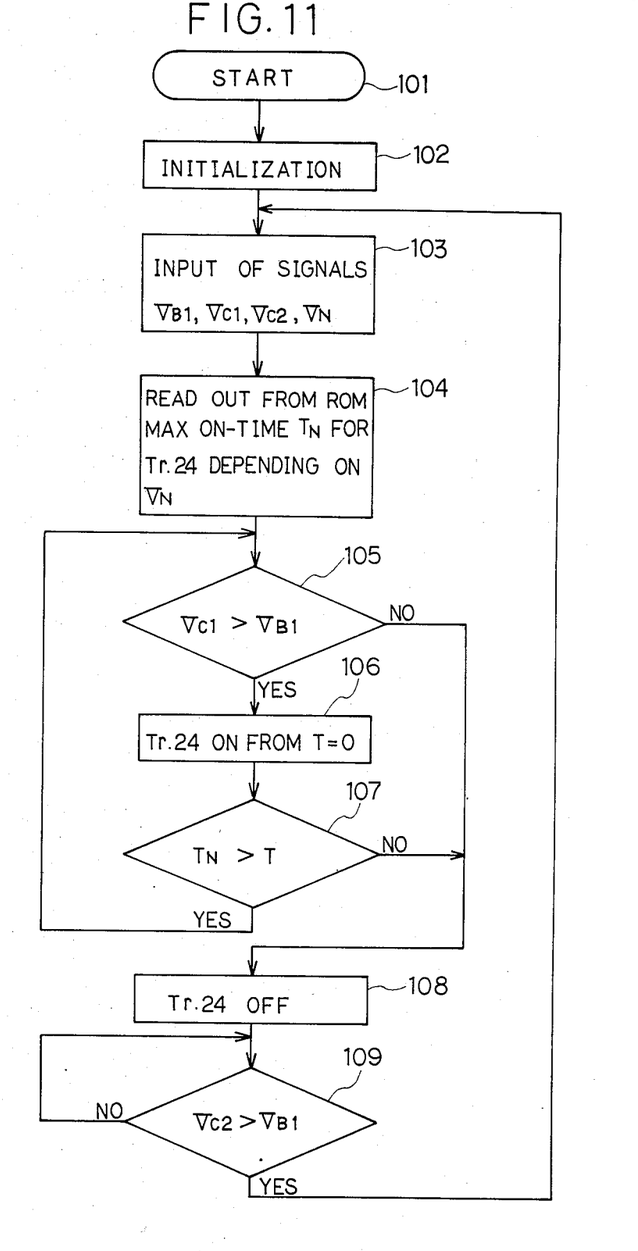
FIG. 11 is a flow-chart for explaining an operation of the microcomputer of the third embodiment.

The third embodiment of the present invention using a microcomputer will be explained with reference to FIGS. 10 and 11.

A microcomputer 31 is connected to a voltage stabilizer and comprises a central processing unit CPU, an input-output device I/O, a random access memory RAM and a read only memory ROM which are connected to each other through a data bus 32. I/O receives the battery voltage $V_{B1}$, the frequency (rotation) signal $V_N$ and first and second reference voltage signals $V_{C1}$ and $V_{C2}$, wherein $V_{C1}$ is set higher than $V_{C2}$.

A program is previously stored in ROM such that a maximum on-time $T_N$, during which the power transistor 24 is made conductive, is produced corresponding to the frequency signal $V_N$.

In operation, when the ignition key switch 5 is closed, the computer 31 is initialized at a step 102 and I/O receives at a step 103 the signals $V_{B1}$, $V_{C1}$, $V_{C2}$ and $V_N$ and converts those signals into binary code signals which are temporarily memorized in RAM. At a step 104, the maximum on-time $T_N$ is read out from ROM, corresponding to the binary code signal of $V_N$ memorized in RAM, and is also temporarily memorized in RAM. The battery voltage $V_{B1}$ is compared with the first reference voltage $V_{C1}$ at a step 105, and when the voltage $V_{B1}$ is lower than the voltage $V_{C1}$, the transistor 24 is made conductive at a step 106 to flow the field current.

An instant time T is compared with the maximum on-time $T_N$ at a step 107 and when $T_N$ is larger than T the program goes to the step 105.

When $V_{B1}$ is lower than $V_{C1}$ or T is lower than $T_{N1}$, the transistor 24 is made nonconductive at a step 108 to cut off the field current. The battery voltage $V_{B1}$ is compared with the second reference voltage $V_{C2}$ at a step 109, which is lower than $V_{C1}$, and when $V_{B1}$ is lower than $V_{C2}$ the program goes to the step 103. Repeating the above operation, the battery voltage is controlled at the desired value and the field current is limited such that the field current is kept at a value equal to or less than the appropriate maximum field current ($I_{FM}$) for the respective rotational speed of the generator (at the step 107), so that the maximum effective charging current can be obtained and unnecessary and unfavorable heating of the power transistor and/or voltage regulator can be avoided.

What is claimed is:

1. A voltage regulator for an alternating current generator comprising;
   a battery mounted on an automotive vehicle;
   an armature winding for generating an output current to be charged on said battery;
   a field winding connected to said armature winding, a portion of said output current flowing through said field winding as a field current;
   a switching transistor connected to said field winding for permitting said field current to flow through said field winding when said switching transistor is made conductive;
   voltage regulating means for comparing a battery voltage with a predetermined value and driving said switching transistor so that when the battery voltage is lower than said predetermined value, said switching transistor is made conductive; and
   current limiting means for detecting a rotational speed of said generator, for limiting said field current to less than a maximum field current value predetermined to increase as the rotational speed of said generator increases at a range of lower speed, whereby the remaining output current actually effective to charge said battery takes its maximum value for the detected rotational speed of said generator, and said remaining output current increases with an increase in the rotational speed of said generator.

2. A current generating system for an automotive vehicle having a battery comprising;
   a current generator having an armature winding and a field winding, an output current from said armature winding being provided to charge said battery and a portion of said output current flowing through said field winding;

a switching transistor connected to said field winding for permitting said portion of said output current to flow through said field winding when said switching transistor is driven into a conductive state;

an operational amplifier for comparing a battery voltage with a reference voltage and producing an output voltage (Vd) in accordance with the comparison therebetween;

delay circuit means connected to said amplifier for receiving said output voltage and for generating a delay voltage in accordance with said output voltage;

a generating circuit for generating a saw-tooth wave voltage;

a comparator connected to said delay circuit means and said generating circuit for comparing said saw-tooth wave voltage with said delay voltage, said comparator being further connected to said switching transistor and driving said transistor into said conductive state when said delay voltage is higher than said saw-tooth wave voltage; and means connected to said current generator for detecting a rotational speed of said generator and for generating a voltage signal corresponding to the detected rotational speed, said means being further connected to said delay circuit for limiting said delay voltage in accordance with said voltage signal.

3. A current generating system as set forth in claim 2, wherein said delay circuit comprises a series circuit of a resistor and a capacitor a juncture of said series circuit being connected to said comparator.

4. A current generating system as set froth in claim 3, wherein said means comprises:
a frequency-voltage inverter connected to said armature winding for generating said voltage signal; and
a PNP transistor connected at its base to said inverter and at its emitter to said juncture.

5. A current generating system for an automotive vehicle having a battery comprising;
a current generator having an armature winding and a field winding, an output current from said armature winding being provided to charge said battery and a portion of said output current flowing through said field winding;
a switching transistor connected to said field winding for permitting said portion of said output current to flow through said field winding when said switching transistor is driven into a conductive state;
a first comparator for comparing a battery voltage with a referance voltage and producing a high-level or a low-level signal in accordance with the comparison therebetween;
a logic gate connected at its one input terminal to said first comparator and at its output terminal to said switching transistor such that said switching transistor is driven into said conductive state when said battery voltage is lower than said reference voltage; and
current limiting means connected to said generator for detecting a rotational speed of said generator, for generating a current limiting signal in response to the detected rotational speed, said current limiting means being further connected to the other input terminal of said logic gate for supplying said current limiting signal thereto for limiting said field current to less than a maximum field current value predetermined to increase as the rotational speed of said generator increases at a range of lower speed, whereby the remaining output current actually effective to charge said battery takes its maximum value for the detected rotational speed of said generator, and said remaining output current increases with an increase in the rotational speed of said generator.

6. A current generating system as set forth in claim 5, wherein said means limiting circuit comprises;
a frequency-voltage inverter connected to said armature winding for generating a voltage signal in proportion to the rotational speed of said generator;
a generating circuit for generating a saw-tooth wave voltage; and
a second comparator connected to said frequency-voltage inverter and said generating circuit for comparing said voltage signal with said saw-tooth wave voltage and producing a high-level or a low-level signal in accordance with the comparison therebetween, said second comparator being connected to said other input terminal of said logic gate for supplying said high-level or low-level signal from said second comparator to said logic gate to drive said switching transistor into the non-conductive state when said saw-tooth wave voltage is higher than said voltage signal from said frequency-voltage inverter.

7. A current generating system as set forth in claim 6, wherein said current limiting circuit further comprises:
a timer circuit connected to said first comparator and to said generating circuit for generating a low-level signal so long as said first comparator is alternately generating the high-level and the low-level signals within said predetermined intervals so that said saw-tooth wave voltage is not applied to said second comparator.

8. A voltage regulator for an alternating current generator having an armature winding for generating an a.c. output current, a rectifier for rectifying the output current to charge a battery and a field winding connected to receive a portion of the rectified output current as a field current, said voltage regulator comprising:
switching means connected in series with said field winding to render the field current to flow through said field winding when rendered conductive;
voltage detecting means for detecting a voltage across said battery;
comparing means for comparing the detected voltage with a reference value, said comparing means controlling said switching means to increase and decrease the field current when the detected voltage decreases below and increases above the reference value, respectively;
speed detecting means for detecting a rotational speed of said alternating current generator and responsively determining a maximum field current value which increases with the increase in the detected rotational speed, the maximum field current being determined to maximize at the respective detected rotational speed an effective charging current to said battery which corresponds to a difference between the rectified output current from said rectifier and the field current; and
current limiting means operatively connected to said switching means for limiting the field current of said field winding to a value lower than the maximum field current value determined by said speed detecting means irrespective of output of said comparing means which controls said switching means, whereby the effective charging current to said battery is increased with the increase in the rotational speed of said alternating current generator and the decrease in the effective charging current caused by the increase in the field current in excess of the maximum field current value is prevented.

* * * * *